July 17, 1956
E. L. DAYTON
2,754,811
HYDRAULIC VALVE TAPPET
Filed May 25, 1953
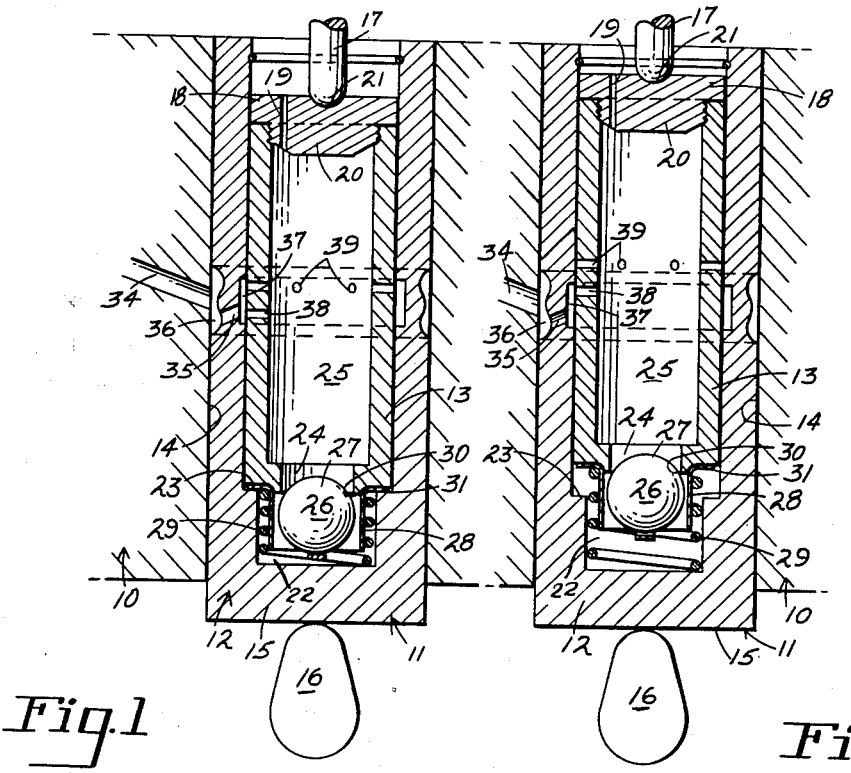
Fig.1  Fig.2
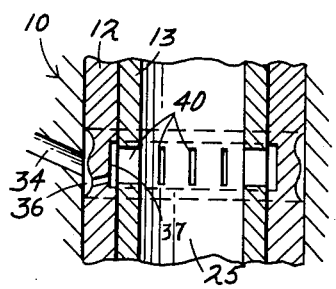
Fig.5
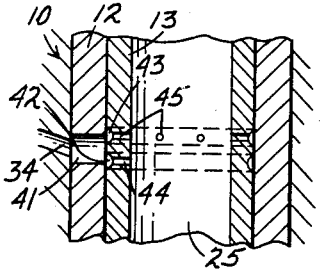
Fig.6
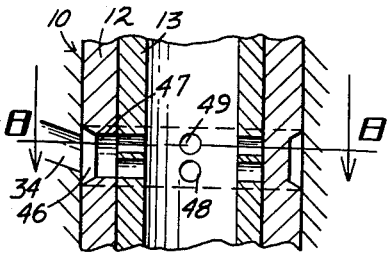
Fig.7
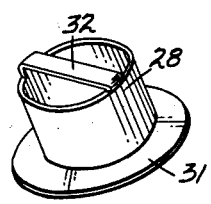
Fig.3
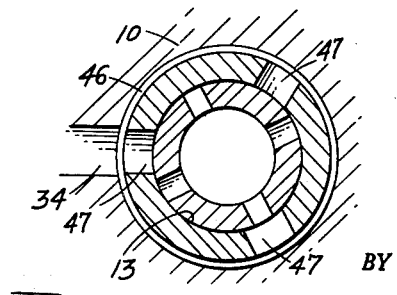
Fig.8
Fig.4
INVENTOR.
ERNEST L. DAYTON.
BY Whittemore, Hulbert & Belknap

United States Patent Office 2,754,811
Patented July 17, 1956

2,754,811

HYDRAULIC VALVE TAPPET

Ernest L. Dayton, Detroit, Mich.

Application May 25, 1953, Serial No. 357,205

12 Claims. (Cl. 123—90)

This invention relates to an improved hydraulic valve tappet assembly of the type suitable for use in connection with internal combustion engines.

Hydraulic tappet assemblies as used in internal combustion engines are usually supplied with oil from the lubricating system of the engine and function to take up clearance between the valve push rods and tappets automatically as soon as such clearance exists. The specific structure of hydraulic valve tappets vary considerably but in general comprise a cylinder and a tubular plunger or piston slidably supported in the cylinder. When installed the bottom of the cylinder is usually engaged by a cam on the cam shaft of the engine and the top of the piston is closed by a plug which ordinarily engages the valve operating push rod of the engine.

Also, an adjusting chamber is normally provided in the cylinder below the piston and the bottom of the piston has a valve controlled port communicating with the adjusting chamber. Hydraulic fluid such as oil is admitted to the adjusting chamber through radial ports formed in the cylinder and piston. The arrangement is such that the clearance between the piston and push rod is taken up by the oil column below the plunger.

One serious problem of hydraulic tappets is that lubricant contained in the cylinder below the piston leaks past the piston when the engine stands idle for a length of time and while provision is made in the form of a passage for supplying lubricant to the cylinder below the piston when the engine is again started, nevertheless, this passage is ordinarily highly restricted. Hence, in cold weather or when the viscosity of the lubricant is high, some considerable time is required for the lubricant to flow through the restricted passage in sufficient quantity to take up the clearance between the valve and push rod. Consequently, a very severe knock prevails in the engine until the viscosity of the lubricant is lowered sufficiently to flow freely through the restricted passage and establish the required lubricant column below the piston.

With the above in view it is an object of this invention to provide a hydraulic tappet assembly constructed in a manner such that in the so-called leak-down position of the piston in the cylinder the effective area of the passage is substantially increased and during normal operation of the engine at the desired temperature the effective area of the passage is reduced to establish the required restricted flow of lubricant. Thus the lubricant below the piston is quickly replenished when the engine is started regardless of the high viscosity of the lubricant without interfering with the performance of the tappet during normal operation of the engine.

It is another object of this invention to provide a hydraulic valve tappet having a ball check valve at the bottom of the piston and having a retainer for the ball valve member constructed to not only hold the ball member in its proper relationship to the adjacent valve seat but in addition, to permit relatively unobstructed passage of lubricant therethrough.

It is still another object of this invention to provide a valve tappet assembly wherein the closure for the top of the piston is secured to the piston in a manner to prevent displacement of the closure in response to increases in pressure within the piston.

The foregoing as well as other objects will be made more apparent as this description proceeds, especially when considered in connection with the accompanying drawing, wherein:

Figure 1 is an enlarged longitudinal sectional view through a hydraulic valve tappet embodying the features of this invention.

Figure 2 is a view similar to Figure 1 showing the parts in a different position;

Figure 3 is a perspective view of the check valve retainer shown in Figures 1 and 2;

Figure 4 is a fragmentary sectional view showing the method used in setting the check valve;

Figures 5, 6 and 7 are respectively fragmentary sectional views showing different embodiments of the invention; and Figure 8 is a cross-sectional view taken on the line 8—8 of Figure 7.

Referring now more in detail to the drawings, the numeral 10 indicates a part of an internal combustion engine and the numeral 11 designates a hydraulic valve tappet assembly embodying the features of this invention. The tappet assembly comprises a cylinder 12 and a piston 13 supported within the cylinder for sliding movement. The cylinder 12 is in turn slidably mounted in a bore 14 formed in the part 10 and the bottom of the cylinder is closed by a wall 15. The bottom surface of the wall 15 forms a bearing for engagement with a cam 16 forming a part of the usual engine cam shaft (not shown). The top of the cylinder 12 is open for receiving a push rod 17 which is operatively connected to one valve of the engine in a manner forming no part of this invention and hence is not shown herein.

The piston 13 is tubular in cross-section and the top of the piston is closed by a cap 18 which is securely fixed to the piston. In the present instance the cap 18 has a restricted vent 19 therethrough and has a reduced part 20 externally threaded for threadably engaging internal threads formed in the upper end of the piston. The top of the cap has a semi-spherical recess 21 for pivotally engaging a corresponding semi-spherical portion at the lower end of the push rod 17. The arrangement is such that the hydraulic tappet assembly provides a connection between the cam 16 and push rod 17 for operating the push rod in response to rotation of the cam 16.

The internal diameter of the cylinder 12 is reduced at the bottom to provide an adjusting chamber 22 or lubricant reservoir and to also provide an internal annular shoulder 23 for engaging the bottom of the piston 13 in the leak-down position of the latter within the cylinder. As shown in Figures 1 and 2 of the drawings the bottom of the piston has a port 24 which establishes communication between the adjusting chamber 22 and the space or chamber 25 within the piston. The transfer of lubricant through the port 24 is controlled by a ball check valve 26 at the bottom of the piston 13. The check valve 26 comprises a ball member 27, a retainer 28 and a coil spring 29.

The ball member 27 is of a diameter to engage an annular seat 30 surrounding the port 24 at the bottom of the piston and the retainer 28 holds the ball in a manner to enable movement of the ball by the action of gravity to its open position. The retainer 28 is in the form of a tubular sheet metal member extending around the ball 27 in coaxial relationship to the piston 13. The upper end of the tubular retainer 28 is turned radially outwardly to provide a flange 31 engageable with the underside of the piston 13 and also engageable by the upper end of the spring 29 having its lower end seated on the bottom wall 15 of the cylinder 12. The coil spring 29 is held under compression between the flange 31 and wall 15, and is of sufficient strength to hold the retainer 28 in place on the piston 13 throughout movement of the latter. The coil spring 29 also tends to maintain the piston 13 in its extended position relative to the cylinder 12 during normal operation of the tappet but is not of sufficient strength to prevent movement of the piston 13 to its lowermost or leak-down position shown in Figure 1 of the drawing when operation of the engine is discontinued.

The ball member 27 is held in assembled relationship with the retainer 28 by a cross bar 32 integrally connecting opposite sides of the tubular retainer below the ball 27. The bar 32 is as narrow as consistent with stamping practice and in any case does not restrict the flow of lubricant through the retainer. The free flow of lubricant through the retainer 28 is important because it assists in filling the space below the piston 13 in the leak-down position of the tappet (Figure 1) and also exposes a greater area of the ball 27 to the lubricant in said space to assure instantaneous closing of the ball 27. Also, the axial spacing between the bar 32 and seat 30 is accurately predetermined with respect to the diameter of the ball member 27. In practice the bar 32 is located to afford a pre-selected maximum clearance between the seat 30 and ball 27 in the open position of the latter. It is important to the satisfactory operation of the hydraulic tappet assembly to limit the clearance between the ball 27 and seat 30 to, say, five or seven thousandths of an inch. With a retainer constructed in accordance with the foregoing proper positioning of the bar 32 may be accomplished readily by inserting a feeler gauge 33 (Figure 4) between the ball 27 and bar 32, and thereafter adjust the bar 32 until the ball 27 is firmly engaged with the seat 30.

Lubricant from the pressure system of the engine is supplied to the hydraulic tappet assembly 11 by a passage 34 in the engine part 10 and a port 35 extending through the adjacent wall of the cylinder 12 intermediate the ends of the latter. As shown in Figures 1 and 2 of the drawings the intake side of the port 35 opens into an annular groove 36 formed in the outer surface of the cylinder wall and the discharge side opens into an annular groove 37 formed in the inner surface of the cylinder wall. The annular groove 36 is of sufficient width to register with the supply passage 34 throughout the stroke of the cylinder 12 within the bore 14 in the engine part 10. In the normal operation of the hydraulic tappet assembly the groove 37 communicates with the chamber 25 in the piston 13 through a port 38 formed in the adjacent wall of the piston 13 and the width of the groove 37 is sufficient to register with the port 38 throughout the full stroke of the piston 13 relative to the cylinder 12.

The hydraulic tappet assembly is shown in its normal operating position in Figure 2 of the drawing wherein it will be noted that the bottom of the piston 13 is spaced above the shoulder 23, and a column of lubricant is provided between the lower end of the piston 13 and bottom wall 15 of the cylinder 12. This column of lubricant takes up the clearance between the push rod 17 and engine valve mechanism affording quiet operation of the valve mechanism. The port 38 meters fluid into the chamber 25 in the piston 13 and is highly restricted to avoid building up excessive pressures within the chamber 25. The lubricant admitted to the chamber 25 is maintained in the latter until the pressure below the piston 13 drops sufficiently to enable movement of the ball member 27 away from its seat 30 whereupon lubricant from the chamber 25 flows through the port 24 into the cylinder below the piston. Owing to the fact that the bar 32 of the retainer 28 is very narrow, generous passages are provided at opposite sides of the bar 32 with the result that ample lubricant is available in the retainer to replenish the space below the piston in the open position of the ball member 27, and with the added result that the ball member 27 is more readily responsive to an increase in pressure in the space below the piston. In other words, the ball member 27 will close practically instantaneously upon an increase in pressure in the chamber 22. Hence, there is no apparent lost motion of the parts and objectionable clearance in the engine valve operating mechanism is avoided throughout the operation of the engine. The reduction of lost motion is also assisted by fixing the cap 18 to the top of the piston 13 in a manner such that displacement of the cap by lubricant under pressure in the chamber 25 in the piston is prevented.

In Figure 1 of the drawings the hydraulic tappet assembly is shown in what is commonly referred to in the art as a leak-down position. In other words when the engine is idle, the piston 13 moves downwardly against the action of the spring 29 and lubricant beneath the piston 13 is displaced by the piston upwardly through the joint or clearance existing between the piston and cylinder walls. Eventually the piston 13 seats on the shoulder 23 in the cylinder 12, and a substantial clearance exists between the push rod and engine valve operating mechanism. Although in the above leak-down position of the tappet valve assembly the ball member 27 is spaced from its seat 30 in order to permit lubricant to flow through the port 24 into the space below the piston, nevertheless, in conventional tappet structures a noticeable lag usually exists before sufficient lubricant is supplied to the space below the piston to take up the engine valve clearance after the engine is started. This is due chiefly to the highly restricted nature of the port 38 and to the increased viscosity of the lubricant caused by cooling of the lubricant in the engine crankcase. In other words, considerable time is required for the restricted port 38 to supply lubricant in sufficient quantity to the space beneath the piston to provide the column of lubricant required to take up the engine valve clearance and this condition is frequently aggravated by the restricted passage provided through the retainers in some tappet designs.

In order to overcome the above objection the porting through the piston 13 is substantially increased in area when the piston 13 is in its leak-down position shown in Figure 1 of the drawings, and free flow of lubricant is provided through the retainer 28. More particularly, a plurality of ports 39 are formed in the side wall of the piston 13 above the port 38. The ports 39 are spaced from one another circumferentially of the piston 13 and lie in a common horizontal plane in such relationship to the annular groove 37 that they register with the groove 37 only in the leak-down position of the piston 13. In fact, when the piston is in its lowermost or leak-down position both the row ports 39 and the port 38 communicate with the annular groove 37. Also, as previously stated, the bar 32 is so thin that free flow of lubricant through the retainer 28 is assured regardless of the viscosity of the lubricant. Thus the volume of lubricant supplied to the chamber 25 in the piston 13 is greatly increased in the leak-down position of the piston 13, and the rate at which lubricant is replenished to the space in the cylinder below the piston is increased sufficiently to avoid any appreciable delay in providing the column of lubricant below the piston required to take up the existing valve clearance. The ports 39 are also positioned to be closed by the wall of the cylinder above the annular groove 37 in the normal operating positions of the piston 13, as shown in Figure 2 of the drawing. Consequently the increased volume of lubricant is supplied by the ports 39 only in the leak-down position of the piston 13 and the ports 39 do not interfere with or affect functioning of the valve tappet assembly during normal engine operation.

The same or equivalent results may be obtained by various different porting arrangements. For example, the side wall of the piston 13 may be formed with a plurality of circumferentially spaced slots 40 (Figure 5) elongated in the direction of the piston axis and registerable with the annular groove 37 in the side wall of the cylinder 12. The arrangement is such that when the piston 13 is in its normal operating range in the cylinder 12 only the extreme lower ends of the slots 40 communicate with the groove 37 and hence provide the required restricted or metered flow of lubricant to the piston chamber 25. However, when the piston 13 is in its lowermost or leak-down position in the cylinder 12 (Figure 5) the slots 40 register for their full length with the groove 37 and the volume of lubricant supplied to the piston chamber 25 is greatly increased.

In the embodiment of the invention shown in Figure 6 of the drawing the discharge end of the passage 34 in the engine part 10 communicates directly with a port 41 through the side wall of the cylinder 12. The outer surface of the piston 13 is formed with axially spaced grooves 42 and 43 which respectively communicate with a single port 44 and a row of circumferentially spaced ports 45 formed in the side wall of the piston 13. The construction is such that when the piston 13 is in its normal operating range the annular groove 43 is closed by the inner surface of the cylinder wall above the port 41 so that lubricant from the passage 34 is metered to the piston chamber 25 through the single port 44. This condition continues until the piston 13 moves to its lowermost or leak-down position shown in Figure 6, at which time both the annular grooves 42 and 43 register with the port 41 to substantially increase the volume of lubricant supplied to the chamber 25 in the piston 13.

In Figures 7 and 8 still another embodiment of the invention capable of accomplishing the above results is shown. The passage 34 in the engine part 10 registers with an annular groove 46 formed in the external surface of the cylinder 12 and the groove 46 communicates with the interior of the cylinder 12 through three ports 47 spaced equal distances from each other circumferentially of the cylinder 12. The wall of the piston 13 has two rows of ports 48 and 49 spaced from each other axially of the piston 13. Each row contains four ports spaced equal distances from each other circumferentially of the piston 13 and arranged in such a manner that when the piston 13 is in its lowermost or leak-down position shown in Figure 7, one port in each row communicates with one of the ports 47 in the cylinder 12. The top row of ports 49 is sealed off by the inner surface of the cylinder wall directly above the ports 47 when the piston 13 is in its normal operating range. Thus when the valve tappet is operating normally only a limited amount of lubricant is supplied to the piston chamber 25 and this amount is doubled as soon as the piston 13 assumes its lowermost or leak-down position.

It follows from the above that each embodiment of the invention provides for reducing the time interval required to take up the engine valve clearance existing when the piston of the valve tappet assembly is in its lowermost or leak-down position in the cylinder, and accomplishes this result notwithstanding substantial increases in the viscosity of the lubricant caused by cooling of the lubricant when the engine is idle for long periods. Moreover, in each embodiment of the invention the rate of delivery of lubricant to the space in the cylinder below the piston is materially increased in the leak-down position of the piston in the cylinder while maintaining a highly restricted flow of lubricant to the piston chamber in the normal operating stroke of the piston in the cylinder. Thus the present invention represented by the above specific embodiments overcomes one of the serious objections to hydraulic valve tappets and hence renders it possible to greatly improve engine performance.

The drawings and the foregoing specification constitute a description of the improved hydraulic valve tappet in such full, clear, concise and exact terms as to enable any person skilled in the art to practice the invention, the scope of which is indicated by the appended claims.

What I claim as my invention is:

1. A hydraulic valve tappet assembly comprising a cylinder having one end closed and having a chamber at the closed end for accommodating a hydraulic fluid medium, an inlet port for hydraulic fluid medium in one side of the cylinder intermediate the ends thereof, a seat in the cylinder at the axially inner side of the chamber, a piston mounted in the cylinder for longitudinal sliding movement between a collapsed position wherein the end of the piston adjacent the closed end of the cylinder engages said seat and an extended position wherein the said end of the piston is spaced axially of the cylinder from the seat, a fluid passage in the piston adapted to communicate with the chamber, porting in the piston connected to said passage and registering with the inlet port throughout the effective stroke of the piston, said porting having provision for supplying a restricted quantity of fluid to the passage in the extended position of the piston and for materially increasing the quantity of fluid admitted to the passage in the collapsed position only of the piston, and valve means for controlling communication between the passage and chamber.

2. The hydraulic valve tappet defined in claim 1 wherein the porting in the piston comprises axially spaced ports so arranged with respect to the inlet port that in the collapsed position of the piston all of said ports in the piston communicate with the inlet port and in all other positions of longitudinal movement of the piston a number of the ports in the piston are closed by the adjacent wall of the cylinder.

3. The hydraulic valve tappet defined in claim 1 wherein the cylinder has an annular groove in the inner surface communicating with the inlet port, and wherein the porting in the piston comprises circumferentially spaced slots elongated in the direction of the piston axis and registering with said annular grooves.

4. The hydraulic valve tappet defined in claim 1 wherein the cylinder has a plurality of inlet ports spaced from one another circumferentially of the cylinder and wherein the porting in the piston comprises a first row of ports spaced from one another circumferentially of the piston in a manner such that only one of the ports in the piston is registerable with one of the ports in the cylinder regardless of the rotative position of the piston relative to the cylinder, a second row of ports in the piston spaced axially from the first row and having the same circumferential spacing as the ports in the first row, the two rows of ports being so arranged with respect to the ports in the cylinder that in the collapsed position of the piston a port in each row registers with one port in the cylinder and in the extended position of the piston only one port in one row communicates with one port in the cylinder.

5. A hydraulic valve tappet assembly comprising a cylinder having the lower end closed and having a chamber at the bottom of the latter, a piston supported in said cylinder for movement longitudinally thereof between a collapsed position adjacent the closed end of said cylinder and an extended position more remote from said closed end, said piston having a chamber therein communicating with the chamber in said cylinder through a port in said piston, an inlet port in one side of said cylinder intermediate the ends thereof for supplying hydraulic fluid under pressure to the interior of said cylinder, porting through said piston arranged to connect said inlet port to the chamber in said piston in all positions of longitudinal movement of said piston relative to said cylinder and having provision for increasing the quantity of hydraulic fluid medium admitted to the chamber in said piston in the collapsed position only of the latter, and valve means controlling the flow of hydraulic fluid medium through the port in said piston.

6. A hydraulic valve tappet assembly comprising a cylinder having one end closed and having an inlet port for hydraulic fluid medium in one wall intermediate the ends thereof, a piston mounted in said cylinder for longitudinal sliding movement between a collapsed position adjacent the closed end of said cylinder and an extended position spaced axially from the closed end of said cylinder, a fluid passage in the piston extending through the end of said piston facing the closed end of said cylinder, and porting through said piston arranged to connect said cylinder inlet port to the passage in all positions of longitudinal movement of said piston relative to said cylinder and having provision for increasing the quantity of fluid admitted to the passage in the collapsed position only of said piston.

7. A hydraulic valve tappet assembly comprising a cylinder having one end closed and having a chamber therein at the closed end, a piston movable longitudinally in said cylinder between a collapsed position adjacent the closed end of said cylinder and an extended position more remote from said closed end, said piston having a chamber therein communicating with the chamber in said cylinder through a port in said piston, an inlet port in one side of said cylinder intermediate the ends thereof for supplying hydraulic fluid under pressure to the interior of said cylinder, porting through said piston arranged to connect said inlet port to the chamber within said piston in all positions of longitudinal movement of said piston relative to said cylinder and having provision for increasing the quantity of hydraulic fluid medium admitted to the piston chamber in the collapsed position only of said piston in said cylinder, valve means controlling the flow of hydraulic fluid medium through the port in said piston, said valve means comprising an annular seat surrounding the piston port at the side of the latter facing the closed end of said cylinder, a ball valve member positioned between the closed end of said cylinder and adjacent end of said piston and engageable with said seat to close the port in said piston in response to an increase in pressure in the closed end of said cylinder, a retainer for said ball valve member having a cylindrical wall which encircles said ball valve member and having a radially outwardly extending annular flange positioned against said adjacent end of the piston, a spring compressed between said flange and the closed end of the cylinder for holding said retainer in place against the said adjacent end of the piston, and a bar secured to said retainer in a position to engage the side of said ball member opposite the seat and being relatively narrow to afford openings at opposite sides thereof of substantial area for the transfer of fluid.

8. A hydraulic valve tappet assembly comprising a cylinder having one end closed and having a chamber at the closed end for accommodating a hydraulic fluid medium, a piston supported in said cylinder for movement longitudinally thereof between a collapsed position adjacent said closed end and an extended position more remote from said closed end, said piston having a chamber communicating with the chamber in said cylinder through a port in said piston, an inlet port in one side of said cylinder intermediate the ends thereof for supplying hydraulic fluid to the interior of said cylinder, main porting through said piston arranged to connect said inlet port to the chamber in said piston in all positions of longitudinal movement of said piston relative to said cylinder, supplemental porting through said piston arranged to connect said inlet port to the chamber within said piston only when said piston is in substantially collapsed position, said supplemental porting being closed by an adjacent wall of said cylinder in all other positions of longitudinal movement of said piston relative to said cylinder, and valve means controlling the flow of hydraulic fluid through the port in said piston.

9. A hydraulic valve tappet assembly comprising a cylinder having one end closed and having a chamber at the closed end for accommodating a hydraulic fluid medium, a piston supported in said cylinder for movement longitudinally thereof between a collapsed position adjacent said closed end and an extended position more remote from said closed end, said piston having a chamber communicating with the chamber in said cylinder through a port in said piston, an inlet port in one side of said cylinder intermediate the ends thereof for supplying hydraulic fluid to the interior of said cylinder, a main port through said piston arranged to connect said inlet port to the chamber in said piston in all positions of longitudinal movement of said piston relative to said cylinder, a supplemental port through said piston spaced axially along said piston from said main port and arranged to connect said inlet port to the chamber in said piston only when said piston is in substantially collapsed position, said supplemental port being closed by an adjacent wall of said cylinder in all other positions of longitudinal movement of said piston relative to said cylinder, and valve means controlling the flow of hydraulic fluid through the first-mentioned port in said piston.

10. A hydraulic valve tappet assembly comprising a cylinder having one end closed and having a chamber at the closed end for accommodating a hydraulic fluid medium, a piston supported in said cylinder for movement longitudinally thereof between a collapsed position adjacent said closed end and an extended position more remote from said closed end, said piston having a chamber communicating with the chamber in said cylinder through a port in said piston, an inlet port in one side of said cylinder intermediate the ends thereof for supplying hydraulic fluid to the interior of said cylinder, porting through said piston arranged to connect said inlet port to the chamber in said piston in all positions of longitudinal movement of said piston relative to said cylinder and having provision for increasing the quantity of hydraulic fluid admitted to the chamber in said piston in the collapsed position of the latter, said porting including a port elongated in the direction of the piston axis and registering with said inlet port.

11. A hydraulic valve tappet assembly comprising a cylinder having one end closed and having a chamber at the closed end for accommodating a hydraulic fluid medium, a piston supported in said cylinder for movement longitudinally thereof between a collapsed position adjacent said closed end and an extended position more remote from said closed end, said piston having a chamber communicating with the chamber in said cylinder through a port in said piston, an inlet port in one side of said cylinder intermediate the ends thereof for supplying hydraulic fluid to the interior of said cylinder, a main port through said piston arranged to connect said inlet port to the chamber in said piston in all positions of longitudinal movement of said piston relative to said cylinder, a plurality of supplemental ports through said piston spaced axially along said piston from said main port and arranged to connect said inlet port to the chamber in said piston only when said piston is in substantially collapsed position, said supplemental ports being closed by an adjacent wall of said cylinder in all other positions of longitudinal movement of said piston relative to said cylinder, and valve means controlling the flow of hydraulic fluid through the first-mentioned port in said piston.

12. A hydraulic valve tappet assembly as defined in claim 11, said cylinder having an internal annular groove communicating with said inlet port and located to connect said main port to said inlet port in all positions of longitudinal movement of said piston and to connect said supplemental ports to said inlet port only when said piston is in substantially collapsed position.

References Cited in the file of this patent

UNITED STATES PATENTS

| 1,360,449 | Schumann | Nov. 30, 1920 |
| 2,074,155 | Truesdell | Mar. 16, 1937 |
| 2,203,952 | Eshbaugh | June 11, 1940 |
| 2,237,854 | Voorhies | Apr. 8, 1941 |
| 2,672,133 | Etchells | Mar. 16, 1954 |

FOREIGN PATENTS

| 349,508 | Great Britain | May 26, 1931 |
| 988,202 | France | Aug. 24, 1951 |